United States Patent Office 3,649,563
Patented Mar. 14, 1972

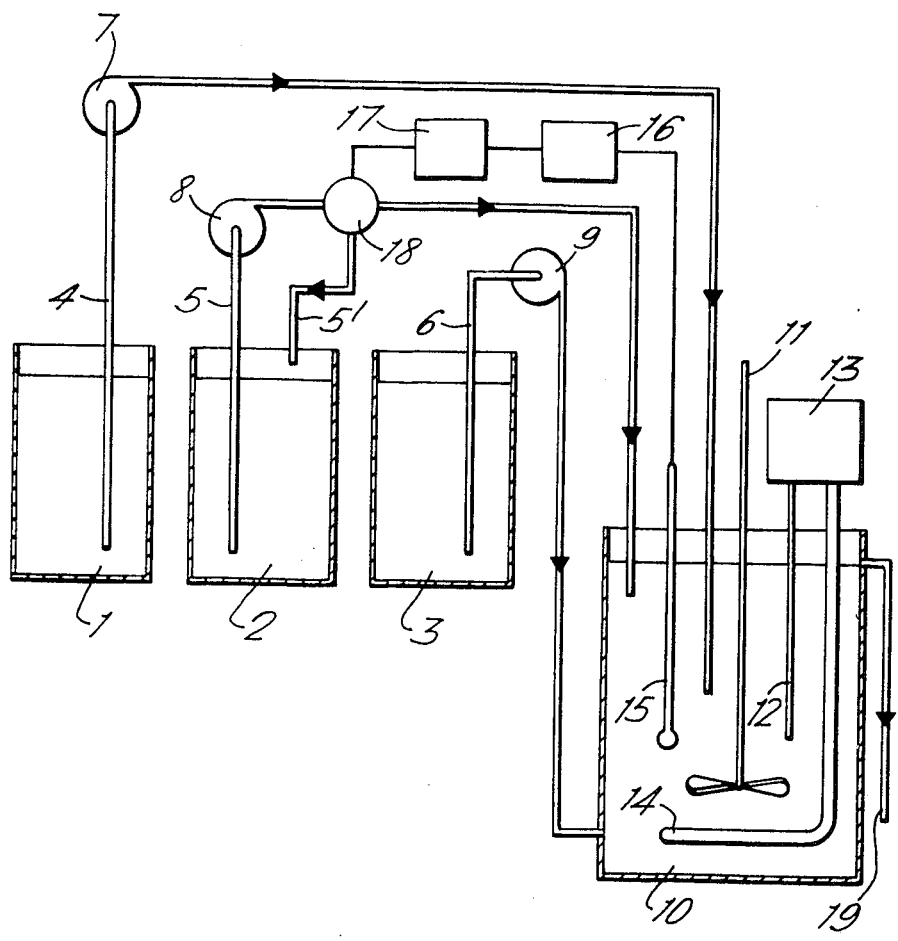

3,649,563
CATALYST COMPOSITION
Ebo Jan Holscher, Cornelis Okkerse, and Adrianus Rozendaal, Vlaardingen, Netherlands, assignors to Lever Brothers Company, New York, N.Y.
No Drawing. Filed Aug. 28, 1969, Ser. No. 853,868
Int. Cl. B01j 1/22
U.S. Cl. 252—459     8 Claims

ABSTRACT OF THE DISCLOSURE

A process for preparing a nickel-on-silica catalyst using sodium hydroxide at a pH of 7 to 10.5 as the precipitating agent for the nickel in which a catalyst with improved selectivity without loss of activity is obtained by subjecting the precipitated nickel hydroxide on silica to an aqueous heating step at 50° C. to 120° C. and at pH 11 to 13.5 before drying and activating the catalyst.

---

This invention relates to a process for preparing a nickel-on-silica catalyst, in particular to a nickel-on-silica catalyst suitable for the selective hydrogenation of glyceride oils.

Most fatty oils contain in their triglycerides poly-unsaturated acids together with mono-unsaturated acids. In the catalytic hydrogenation of such oils a number of competitive reactions may take place, some of which are undesirable as they give rise to the formation of fully hydrogenated fats which are less suitable for edible purposes.

By using suitable selective catalysts, which are catalysts that promote one reaction while being not or at least much less active in other reactions, it is possible to avoid substantially the formation of undesirable by-products. It is known that supported nickel catalysts, in particular nickel-on-silica catalysts, are suitable for such selective hydrogenation, provided that they meet certain requirements regarding their structure. A very important factor in this connection is the width of the pores of the supported catalyst. According to J. W. E. Coenen, H. Boerma, B. G. Linsen and B. de Vries in "Proceedings Third International Congress on Catalysis," vol. II (1965), p. 1387, the selectivity of a nickel-on-silica catalyst is highly dependent on the volume of the pores having a diameter of less than 25 A. in relation to the total pore volume. By the term selectivity as used in this specification is meant the selectivity of a catalyst as expressed by the dilatation at 30° C. ($D_{30}$) (determined as described in H. A. Boekenoogen "Analysis and Characterization of Oils and Fat Products," London, New York, Sydney, 1964, vol. 1, p. 144) of a standard soybean oil, 100 g. of which has been hydrogenated using a sample of the catalyst containing 0.2 g. of nickel under standard conditions, viz. 100° C. and a hydrogen flow of 60 litres per hour until an iodine value (I.V.) of 90± is reached.

In addition to being selective such hardening catalyst should also be active and resistant to poisons because otherwise the amount of catalyst to be added or spent during the hydrogenation process will be too high, which will be unacceptable for economic reasons. The last two properties are also dependent on the pore size distribution of the carrier, but more particularly they are determined by the size of the nickel particles present on the surface. In this connection an important characteristic is the nickel consumption. By this term as used in this specification is to be understood the minimum quantity of nickel (expressed in grams) required to harden 100 g. of a standard whale oil (having a sulphur content of 30 p.p.m.) under standard conditions (hydrogenation time 8 hours; temperature 180° C.; hydrogen flow of 60 litres per hour) to give a product having a refractive index of $N_D{}^{65}=1.4480$.

Although numerous processes and modifications thereof have been described in the literature for the preparation of nickel-on-silica catalysts, the industrial production in a reproducible manner of such catalysts having the desired characteristics, has still not been solved satisfactorily. One of the cheapest and therefore probably one of the most frequently used processes is a process wherein the nickel is precipitated from an aqueous solution of a nickel salt in the form of its hydroxide and/or carbonate onto the supporting material and the resulting composition is activated under reducing conditions. A serious disadvantage of this process is that it is very difficult to obtain in a reproducible manner a catalyst wherein a high specific nickel surface (surface of the nickel particles per gram nickel) is combined with optimal pore size distribution.

It has now been found that a nickel-on-silica catalyst can be prepared in which the requirements concerning selectivity, activity and poison resistance are met in a very satisfactory and reproducible manner by employing a process in which nickel hydroxide is precipitated from an aqueous solution of a nickel salt by an alkali metal hydroxide at a pH between 7 and 10.5 as measured at 20° C., and during or after the precipitation a solid silica catalyst support is added, a nickel hydroxide on silica composition is isolated, washed and dried and subjected to an activation process by heating in the presence of hydrogen, and wherein the composition before it has been dried is subjected to a heat treatment with an aqueous solution of an alkali metal hydroxide of a pH between 11 and 13.5 and at a temperature between 50 and 120° C., to give a composition which on reduction with hydrogen for 30 minutes at 450° C. and a hydrogen flow of 30 litres per hour, yields a catalytic material having a nickel consumption as hereinbefore defined of less than 0.10 g. and a selectivity as hereinbefore defined of $D_{30}<100$.

In the above process the heat treatment of the mixture of nickel hydroxide and silica containing supporting material with aqueous alkali metal hydroxide is the crucial step. Nevertheless, although the various other preceding steps may be varied to a certain degree without affecting the quality of the resulting catalyst, a number of requirements has to be met.

First the use of alkali metal hydroxide as precipitating agent in the first step is essential as the process will not give the desired results when using alkali metal carbonate. It is known that nickel hydroxide can be precipitated at any pH exceeding a certain lower limit, but in order to obtain a precipitate of nickel hydroxide which will give satisfactory results it is important that the pH at which it is precipitated is not too high and it has been found that precipitation at a pH of between 7 and 10.5 is essential for obtaining a catalyst with the desired properties. Particularly good results are obtained when precipitating the nickel hydroxide from aqueous nickel sulphate at a pH between 8 and 10. Preferably the pH is kept at a constant level throughout the precipitation, by which is meant that the deviation does not exceed a value of ±0.2. (N.B. The above pH values of the reaction mixture are valid when measured at a temperature of 20° C.; the actual values at higher temperatures to be corrected accordingly.)

Although in general the temperature at which the nickel hydroxide is precipitated is not critical, it is preferred to conduct the precipitation at elevated temperature, e.g. above 90° C., which is particularly important when nickel sulphate is used as a starting material.

The most simple and therefore preferred method of combining the aqueous solutions of the nickel salt and the alkali metal hydroxide is to introduce the two solutions simultaneously under stirring into a mixing vessel while maintaining within this vessel the above-mentioned pH range, which can be achieved very conveniently in an automatic manner by coupling the rate of addition of one of the solutions to the pH of the formed mixture by means of a device known in the art.

The silica containing supporting material can be added to the nickel hydroxide during or after the precipitation thereof. If the former method is used, care must be taken that no suspension of the silica containing material in the aqueous alkali metal hydroxide is formed before combining the latter solution with the aqueous solution of the nickel salt, the reason being that in such a suspension silicate ions would be formed which on subsequently combining the suspension and the aqueous solution of the nickel salt would give rise to the precipitation of basic nickel silicate which would have an adverse effect on the quality of the catalyst finally obtained.

A very simple and effective way of adding the supporting material to the nickel hydroxide is to apply the above-described preferred method of combining the aqueous solutions of the nickel salt and of the alkali metal hydroxide, and to introduce the supporting material simultaneously into the mixing vessel, either as such or in the form of a separate aqueous suspension or suspended in the aqueous solution of the nickel salt.

The next step, the preparation of the mixture comprising the freshly precipitated nickel hydroxide, the silica containing supporting material and the aqueous alkali metal hydroxide having a pH of between 11 and 13.5, can be carried out in any suitable manner. When in the first part of the process the above-described preferred method is used for combining the supporting material with the nickel hydroxide, the suspension obtained can be converted into the mixture having the required pH by two different methods, viz either the pH of the suspension can be adjusted directly to the desired value by adding more concentrated aqueous alkali metal hydroxide or the solids can be separated from the suspension and then mixed with aqueous alkali metal hydroxide of a suitable pH to give a mixture of the required pH.

The subsequent step, heat treatment of the mixture having the desired pH and obtained by any of the above-mentioned methods, can again be carried out in various ways. Although contact of the three components even at only slightly elevated temperatures will ultimately result in a catalyst having the desired characteristics, in practice the contact period will have to be reduced to an acceptable level, which means that the lower limit of the temperature at which the mixture is kept should not be substantially below 50° C. On the other hand, owing to the presence of water in the mixture the upper limit of the temperature range will be about 100° C. or only slightly above. It would of course be possible to heat the mixture in a closed vessel under superatmospheric pressure so that a higher temperature could be reached, but increasing the temperature too much will have an adverse effect on the pore structure of the supporting material, so that the desired effect will be lost. For this reason the upper limit of the temperature range will be about 120° C.

Where the mixture consists of a reasonably thin slurry or suspension, it can simply be heated at the desired temperature, preferably under boiling conditions. As the period during which such mixtures must be heated in order to obtain the desired result is dependent on various factors such as pH and temperature, no exact values regarding lower and upper limits of this heating period can be given. However, this time can be determined by those skilled in the art in preliminary experiments by relatively simple methods. For this purpose a sample of the mixture to be heated is submitted to the heat treatment under the desired conditions and samples are taken from the reaction mixture at various intervals. These samples are then filtered off, dried and reduced with hydrogen at 450° C. by conventional methods, using a hydrogen stream of 30 l./hr. per 0.5 g. composition. The catalysts thus obtained are characterized by determining their nickel consumption and their selectivity in the aforementioned manner.

These parameters are then taken as a measure for the period during which the mixture has to be submitted to the heat treatment. The lower limit of this period is that at which a composition is obtained yielding a catalyst having a nickel consumption of less than 0.10 g. per 100 g. standard whale oil. Although even prolonged heating will not affect this parameter very much, such heating ultimately will have an adverse effect on the selectivity. For this reason the upper limit of the heating period is such that the dilatation at 30° C. ($D_{30}$) will still be below 100.

By way of illustration it can be shown that very good results are obtained by boiling a suspension of freshly precipitated nickel hydroxide and supporting material in aqueous alkali metal hydroxide having a pH of 12 to 13 for a period of 5 to 10 minutes.

It may be remarked here that boiling a suspension of freshly prepared nickel hydroxide and silica containing material in aqueous alkali metal hydroxide as obtained in the first phase of the process and having a pH of 7 to 10.5, will not produce a composition with the desired characteristics, illustrating that adjustment of the pH at 11 to 13.5 is essential.

In an alternative method the mixture having a pH of 11 to 13.5 is submitted to the heat treatment as follows. First most of the aqueous solution is removed from the mixture, e.g. by filtration or centrifugation. The resulting paste is then dried, also at 50 to 120° C. by conventional methods until no more loss in weight is observed. Normally the resulting composition will yield a catalyst having the required characteristics, but also this should be checked in preliminary experiments because under certain conditions, e.g. when the paste is dried in a very thin layer, the drying time will be too short to allow sufficient interaction between the components. This has to be avoided because once the composition has been freed from water, even a repeated heat treatment will not sufficiently improve the quality of the composition. As the effect of the heat treatment is not only dependent on the contact time but also on the pH of the aqueous alkali metal hydroxide, it is advisable in cases when short drying times are expected, e.g. when the mixture is dried in small quantities or in a thin layer, to increase the pH of the aqueous alkali metal hydroxide to a value of at least 12.

Whichever method of heating of the mixture is used, it is preferred to free the solid composition as far as possible from foreign ions originating from the nickel salt used as starting material by washing it with water or with aqueous alkali metal hydroxide before it is dried. When nickel sulphate is used as a starting material this washing step is essential. When the heat treatment consists in boiling a suspension of nickel hydroxide plus supporting material this washing step can be carried out either before or directly after the heat treatment. However, when the treatment consists in drying a thick paste, it must be washed before it is put in the drying oven.

After the heat treatment is finished the resulting composition, obtained either by drying a paste or by boiling a suspension followed by filtering off the solids and drying them, is activated by reducing it with hydrogen by conventional methods, preferably at a temperature of between 400 and 550° C. to yield the desired nickel-on-silica catalyst. A very suitable activation process consists in heating the composition in an atmosphere of hydrogen at a tempertaure of about 450° C. for about 30 minutes.

Although the various above-mentioned steps of the process can be carried out batchwise, some of the modifications are particularly suitable for being conducted in a continuous manner.

In a particularly preferred embodiment of the process according to the invention said modifications are combined into one continuous process as follows. An aqueous solution of a nickel salt and an aqueous suspension of the silica containing material, taken either separately or combined, and an aqueous solution of alkali metal hydroxide are introduced simultaneously into a first vessel provided with a heating equipment, an efficient stirrer, a pH electrode coupled with a pH meter, and an outlet which is normally an overflow.

During the addition the reagents are mixed thoroughly and the formed mixture is maintained at the desired temperature which is preferably kept at a constant value by coupling the heating equipment with a temperature-controlling device. Furthermore the concentration of the reagents and their relative rates of addition are so chosen that the pH of the formed mixture will be maintained at the desired value.

Preferably this is done by controlling the rate of addition of one of the ingredients, usually the aqueous alkali metal hydroxide, e.g. by means of a magnetic valve which is operated by the pH meter registering the pH of the mixture. This valve may directly control the flow of the aqueous alkali metal hydroxide or it may control the flow of an additional stream of alkali metal hydroxide which is superposed on the main stream.

Finally the dimensions of the vessel are so chosen that the mean residence time of the mixed reagents will be between 3 and 10 minutes, preferably between 5 and 7 minutes. The resulting suspension leaving the vessel through the outlet is then introduced into a second vessel also provided with a heating equipment, an efficient stirrer, a pH electrode and an outlet. Simultaneously with this suspension an aqueous solution of alkali metal hydroxide is introduced into this vessel, said solution having a concentration high enough to adjust the pH of the resultant mixture to the required level. The ingredients are mixed thoroughly throughout the process, while the temperature of the mixture and its pH are controlled in the same manner as described above. In this case the pH at the desired value by controlling the rate of addition of the aqueous alkali metal hydroxide. The dimensions of this second vessel are so chosen that the mean residence time will be within the limits determined by preliminary experiments as described above, usually from 5 to 15 minutes.

The suspension leaving the second vessel is then collected and worked as described above.

Accordingly the present invention also provides a continuous process for the preparation of a nickel-on-silica catalyst in which process an aqueous solution of a nickel salt and an aqueous suspension of a silica containing material either separately or combined, and an aqueous solution of an alkali metal hydroxide are introduced into a first reaction vessel at such a rate that the pH of the reaction mixture is between 7 and 10.5, as measured at 20° C., the temperature in the reaction vessel being maintained above 90° C. the reactants having a residence time between 3 and 10 minutes in said vessel to provide a slurry of freshly precipitated nickel hydroxide and silica containing material which slurry is passed to a second reaction vessel in which it has a residence time between 5 and 15 minutes and where it is mixed with further alkali metal hydroxide solution to bring the pH of the contents of the second vessel into the range 11 to 13.5 as measured at 20° C. and in which the temperature is maintained between 50 and 120° C. to give a composition which on reduction with hydrogen for 30 minutes at 450° and with a hydrogen flow of 30 litres per hour, yields a catalytic material having a nickel consumption as hereinbefore defined of less than 0.10 g. and a selectivity as hereinbefore defined of $D_{30} < 100$.

With respect to the materials to be used as starting materials the following can be observed. Although any nickel salt can be used which is soluble in water, it is preferred—in particular for large-scale preparations—to use nickel sulphate since this is the cheapest nickel salt commercially available.

The choice of the silica containing material is again largely determined by economic factors and it has been found that excellent results can be obtained by using kieselguhr, which is a relatively cheap product.

The same situation exists in regard to the choice of the alkali metal hydroxide used in any of the steps of the process and in general sodium hydroxide—being the cheapest—will be used.

The invention is illustrated by the following Examples 3, 4, 5, 6, 7 and 9, whereas the Examples 1, 2, 8, 10 and 11 are given by way of comparison.

In all of these examples the same basic equipment, which is illustrated schematically in the accompanying drawing, was used.

The equipment comprises: three supply vessels 1, 2, 3 connected via ducts 4, 5, 6 and pumps 7, 8, 9 with a reaction vessel 10 equipped with an efficient stirrer 11, a contact thermometer 12 controlling via a first relay 13 a heating coil 14; a set of pH electrodes 15 controlling via a pH meter 16 and a second relay 17 a magnetic three-way valve 18 placed in one of the ducts 5 and connected via a second duct 5 with the supply vessel 2 and an overflow 19 either leading to a filter or to a second reaction vessel identically equipped (not shown).

EXAMPLE 1

(A) Preparation of the mixed suspension of nickel hydroxide and kieselguhr in aqueous sodium hydroxide of pH 9.0±0.2.

The supply vessels were charged as follows: vessel 1 with a suspension of kieselguhr (14 g./litre) in an aqueous solution of nickel sulphate (0.85 N); vessel 2 with an aqueous solution of sodium hydroxide (0.5 N; pH 13.4); vessel 3 with an aqueous solution of sodium hydroxide (0.85 N; pH 13.6).

The reaction was started by simultaneously pumping into the reaction vessel 10 the kieselguhr suspension and the 0.85 N aqueous sodium hydroxide at about equal rates while vigorously stirring the formed suspension with stirrer 11. This suspension is heated by means of the heating coil 14 and is kept at a constant temperature of 96±2° C. The pH of the suspension is adjusted at a constant value of 9.0±0.2 (as measured at 20° C.) by a regular dosing of 0.5 N aqueous sodium hydroxide from supply vessel 2. The total amount of liquids added was such that after steady state had been reached in the vessel 10 the suspension had a mean residence time of about 7 minutes. That part of the suspension leaving the vessel through the overflow 19 before steady state was reached was discarded.

(B) Working up of the suspension

The suspension obtained as described above was filtered off, the filter being exchanged every half hour. The precipitate was washed with water till no more sulphate ions could be shown to be present in the washing liquid, whereafter the resulting wet product was dried for 16 hours at 120° C.

(C) The composition obtained (as described sub B) was activated by known methods by treating it for 30 minutes at 450° C. with a stream of hydrogen at a flow rate of 30 l./hr. per 0.5 g. of composition. The properties of the nickel-on-silica catalyst thus obtained are given in Table 1.

EXAMPLE 2

The mixed suspension of nickel hydroxide and kieselguhr, prepared as described in part A of Example 1 was collected and boiled for 60 minutes.

The precipitate was filtered off and washed with water till the washing liquid was free from sulphate ions, whereafter the wet product was dried for 16 hours at 120° C.

7

The resulting composition was activated as described in part (C) of Example 1, to yield a nickel-on-silica catalyst, the properties of which are also given in Table 1.

EXAMPLE 3

The mixed suspension of nickel hydroxide and kieselguhr prepared as described in part (A) of Example 1 was collected, filtered off and washed with 0.01 N aqeuous sodium hydroxide (pH 12.0) till no more sulphate ions could be shown to be present in the washing liquid. The moist filter cake (the adhering aqueous solution of which had a pH of 12.0) was then dried for 16 hours at 120° C., whereafter the resulting composition was activated as described in part (C) of Example 1, to yield a nickel-on-silica catalyst, the properties of which are given in Table 1.

EXAMPLE 4

The mixed suspension of nickel hydroxide and kieselguhr prepared as described in part (A) of Example 1, was collected and filtered off. The solids were washed with 0.1 N aqueous sodium hydroxide (pH 13.0) till the washing liquid was free from sulphate ions. The wet composition (pH adhering moisture 13.0) was dried for 16 hours at 120° C. and activated as described in part (C) of Example 1, to yield a nickel-on-silica catalyst, the properties of which are given in Table 1.

EXAMPLE 5

(A) The mixed suspension of nickel hydroxide and kieselguhr, prepared as described in part (A) of Example 1, was continuously transferred to a second identically equipped reaction vessel. In this vessel the temperature of the suspension was constantly kept at 98±2° C., whereas the pH was adjusted at a constant value of 13±0.3 (as measured at 20° C.) in a manner completely identical with that in the first vessel, but now by means of a regular dosing of 2 N aqueous sodium hydroxide. The dimensions of this second reaction vessel were such that after steady state was reached, the mean residence time of the suspension in this vessel was about 5 minutes.

After leaving the second vessel through the overflow the suspension was collected and filtered off.

(B) The wet filter cake obtained as described in part (A) of this example was washed with water till no more sulphate ions could be shown to be present in the washing liquid. After drying the resulting wet composition for 16 hours at 120° C., it was activated as described in part (C) of Example 1, to yield a nickel-on-silica catalyst, the properties of which are given in Table 1.

EXAMPLE 6

The wet filter cake, prepared as described in part (A) of Example 5, was washed with 0.05 N aqueous sodium hydroxide (pH 12.7) till the washing liquid was free from sulphate ions. After drying the resulting composition for 16 hours at 120° C., it was activated as described in part (C) of Example 1, to yield a nickel-on-silica catalyst, the properties of which are given in Table 1.

EXAMPLE 7

The mixed suspension of nickel hydroxide and kieselguhr, prepared as described in part (A) of Example 1, was collected and filtered off. The wet solids, without being first washed, were freed as much as possible from adhering moisture by pressing them firmly on the filter, but without drying them. The resulting product was then suspended in about 10 times its volume of 0.1 N aqueous sodium hydroxide (pH 13.0), whereafter this suspension was boiled for 30 minutes. The precipitate was filtered off and washed with water till the wash water was free from sulphate, whereafter it was dried for 16 hours at 120° C. The resulting product was activated as described in part (C) of Example 1 to yield a nickel-on-silica catalyst, the properties of which are given in Table 1.

EXAMPLE 8

(A) The supply vessels were charged as follows: vessel 1 with a suspension of kieselguhr (14 g./litre) in distilled water; vessel 2 with an aqueous solution of sodium hydroxide (0.85 N; pH 13.6); vessel 3 with an aqueous solution of nickel sulphate (0.85 N).

The reaction was started by simultaneously pumping the three components into the reaction vessel 10 the volumes of kieselguhr suspension and of nickel sulphate solution per minute introduced into the vessel being equal and the amount of aqueous sodium hydroxide being so regulated that within the formed suspension the pH is maintained throughout the reaction at a constant level of 9.0±2 (as measured at 20° C.). The total amount of liquid was such that after steady state was reached the mean residence time of the suspension in the vessel was about 6 minutes. Throughout the reaction the formed suspension was stirred vigorously, and its temperature was maintained at 96±2° C. That part of the suspension leaving the vessel through the overflow 19 before steady state was reached, was discarded.

(B) The suspension obtained as described in part (A) of this example was filtered off and the solids were washed with water till the washing water was free from sulphate. The composition thus obtained was dried for 16 hours at 120° C., whereafter it was activated as described in part (C) of Example 1, to give a nickel-on-silica catalyst, the properties of which are given in Table 1.

EXAMPLE 9

The mixed suspension of nickel hydroxide and kieselguhr, prepared as described in part (A) of Example 8, was filtered off and the solids were washed with 0.05 N aqueous sodium hydroxide till the washing liquid was free from sulphate.

After drying the wet product (pH of the adhering aqueous solution 12.7) for 16 hours at 120° C., it was activated as described in part (C) of Example 1, to yield a nickel-on-silica catalyst, the properties of which are given in Table 1.

EXAMPLE 10

(A) The supply vessels were charged as follows: vessel 1 with an aqueous solution of nickel sulphate (0.85 N); vessel 2 with an aqueous solution of sodium hydroxide (0.5 N; pH 13.4); vessel 3 with a suspension of kieselguhr (14 g./litre) in an aqueous solution of sodium hydroxide (0.85 N; pH 13.6).

The reaction was started by simultaneously pumping into the reaction vessel 10 the nickel sulphate solution and the alkaline kieselguhr suspension, using about equal rates of addition while vigorously stirring the resulting suspension.

Throughout the reaction the suspension was kept at a temperature of 96±2° C. whereas its pH was maintained at a constant value of 9.5±0.1 (as measured at 20° C.) by a regular dosing of 0.5 N aqueous sodium hydroxide. The rate of addition of the combined components was such that after steady state was reached the mean residence time of the suspension in the reaction vessel was about 6 minutes. That part of the suspension leaving the vessel 10 through the overflow 19 before steady state within the vessel was reached was discarded.

(B) The mixed suspension of nickel hydroxide and kieselguhr, prepared as described in part (A) of this example, was filtered off and the solids were washed with water till the washing water was free from sulphate. After drying the resulting product for 16 hours at 120° C. it was activated as described in part (C) of Example 1, to give a nickel-on-silica catalyst, the properties of which are given in Table 1.

EXAMPLE 11

The mixed suspension of nickel hydroxide and kieselguhr, prepared as described in part (A) of Example 10, was filtered off and the solids were washed with 0.05 N aqueous sodium hydroxide (pH 12.7) till the washing liquids were free from sulphate.

The wet product (pH of the adhering aqueous solution 12.7) was dried for 16 hours at 120° C. and the dried product was activated as described in part (C) of Example 1 to yield a nickel-on-silica catalyst, the properties of which are given in Table 1.

TABLE 1.—PROPERTIES OF NICKEL-ON-SILICA CATALYSTS

| Example No. | Nickel consumption whale oil at 180° | Selectivity | |
|---|---|---|---|
| | | $D_{30}$ | (I.V.) |
| 1 | 0.18 | 125 | (90) |
| 2 | 0.18 | 140 | (89) |
| 3 | 0.09 | 80 | (90) |
| 4 | 0.09 | 75 | (90) |
| 5 | 0.08 | 75 | (90) |
| 6 | 0.07 | 55 | (90) |
| 7 | 0.07 | 40 | (90) |
| 8 | 0.18 | 100 | (91) |
| 9 | 0.08 | 80 | (90) |
| 10 | 0.13 | 100 | (90) |
| 11 | 0.13 | 100 | (90) |

What is claimed is:

1. A process for the preparation of a nickel-on-silica catalyst suitable for the hydrogenation of fats which comprises precipitating nickel in the form of nickel hydroxide from an aqueous solution of a nickel salt by means of an aqueous solution of an alkali metal hydroxide, while maintaining within the reaction mixture a pH in the range of 7 to 10.5 as measured at 20° C., mixing said nickel hydroxide during or after the precipitation with a solid silica, heating the mixture thus obtained at 50 to 120° C. in the presence of an aqueous alkaline solution having a pH of 11 to 13.5 to give a composition which on reduction with hydrogen for 30 minutes at 450° C. and with a hydrogen flow of 30 litres per hour per 0.5 g. composition yields a catalytic material having a nickel consumption as hereinbefore defined of less than 0.10 g. and a selectivity as hereinbefore defined $D_{30}<100$.

2. A process as claimed in claim 1 in which the pH of the medium in which the nickel hydroxide is precipitated is maintained during the precipitation at 8–10 as measured at 20° C.

3. A process as claimed in claim 1 in which the pH of the reaction medium during the precipitation is maintained at a substantially constant level the maximum deviation being $\mp 0.2$ pH units.

4. A process as claimed in claim 2 in which the temperature of the reaction medium during the precipitation is maintained at 90–100° C.

5. A process as claimed in claim 1 in which the nickel hydroxide is mixed with the solid silica during the precipitation reaction, the carrier material and aqueous alkali metal hydroxide being added in such a way that there is no reaction between these two components.

6. A process as claimed in claim 1 in which a suspension is formed of a mixture of nickel hydroxide and a solid silica in an aqueous medium having a pH of 12–13, said suspension subsequently being heated at boiling temperature for 5–10 minutes.

7. A process as claimed in claim 1 in which the process is carried out as a continuous process by introducing an aqueous solution of a nickel salt and an aqueous suspension of a solid silica either separately or combined, and an aqueous solution of an alkali metal hydroxide into a first reaction vessel at such a rate that the pH of the reaction mixture is between 7 and 10.5 as measured at 20° C., the temperature in the reaction vessel being maintained above 90° C., the reactants having a residence time between 3 and 10 minutes in said vessel to provide a slurry of freshly precipitated nickel hydroxide and a solid silica, passing said slurry to a second vessel in which it has a residence time of between 5 and 15 minutes and where it is mixed with further alkali metal hydroxide solution to bring the pH of the contents of the second vessel into the range of 11 to 13.5 as measured at 20° C. and in which the temperature is maintained between 50 and 120° C. to give a composition which on reduction with hydrogen for 30 minutes at 450° C. and with a hydrogen flow of 30 litres per hour per 0.5 g. composition yields a catalytic material having a nickel consumption as hereinbefore defined of less than 0.10 g. and a selectivity as hereinbefore defined of $D_{30}<100$.

8. A nickel-in-silica catalyst prepared by a process as claimed in claim 1.

References Cited

UNITED STATES PATENTS

| 2,759,023 | 8/1956 | Kool et al. | 252—459 X |
| 1,577,187 | 3/1926 | Patrick | 252—459 |
| 2,244,573 | 6/1941 | Roberts | 252—459 |
| 1,280,314 | 10/1918 | Schwarcman | 252—459 |
| 1,282,296 | 10/1918 | Schwarcman | 252—459 |

DANIEL E. WYMAN, Primary Examiner

W. H. CANNON, Assistant Examiner

UNITED STATES PATENT OFFICE
CERTIFICATE OF CORRECTION

Patent No. 3,649,563          Dated March 14, 1972

Inventor(s) Ebo Jan Holscher et al

It is certified that error appears in the above-identified patent and that said Letters Patent are hereby corrected as shown below:

Column 1, between lines 7 and 8,

Claims priority, Application Great Britain August 28, 1968, 41029/68

Signed and sealed this 30th day of January 1973.

(SEAL)
Attest:

EDWARD M. FLETCHER, JR.
Attesting Officer

ROBERT GOTTSCHALK
Commissioner of Patents